Patented Jan. 22, 1935

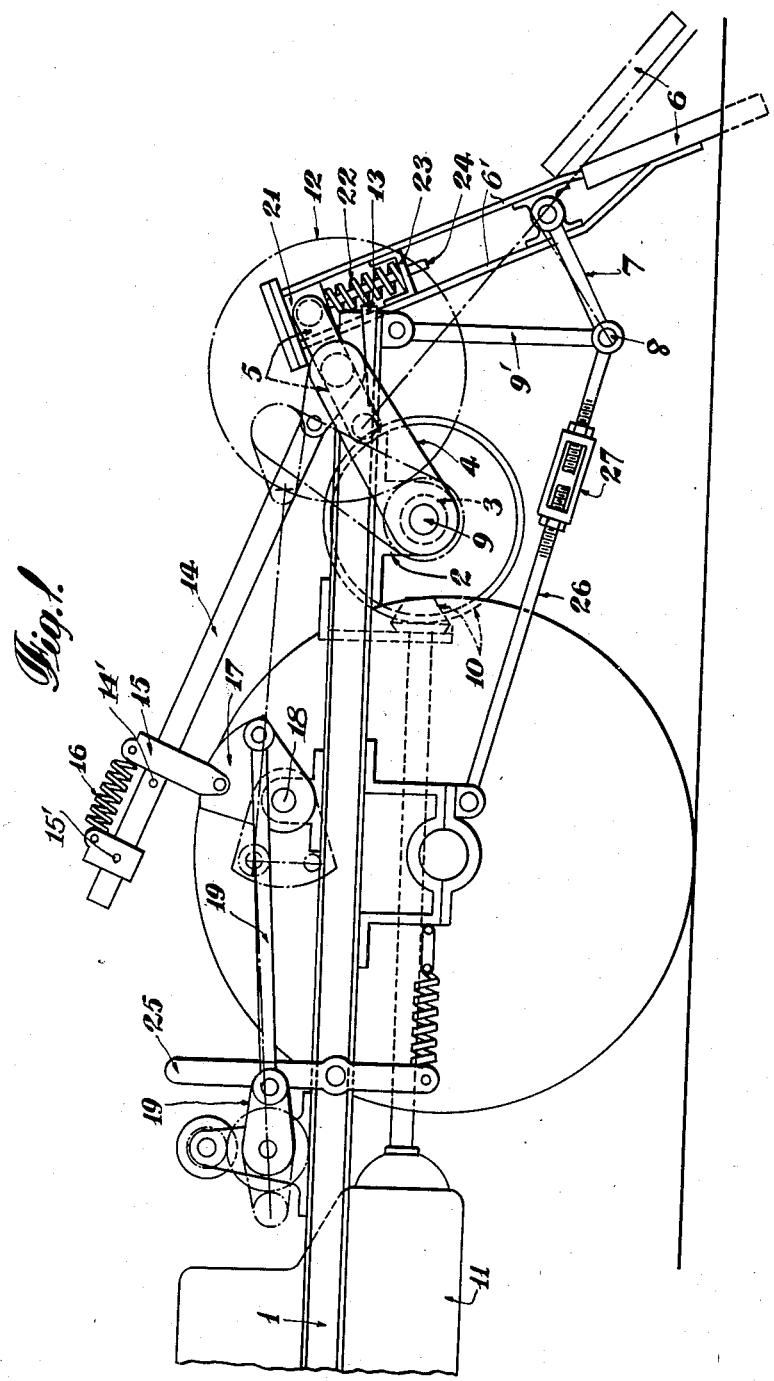

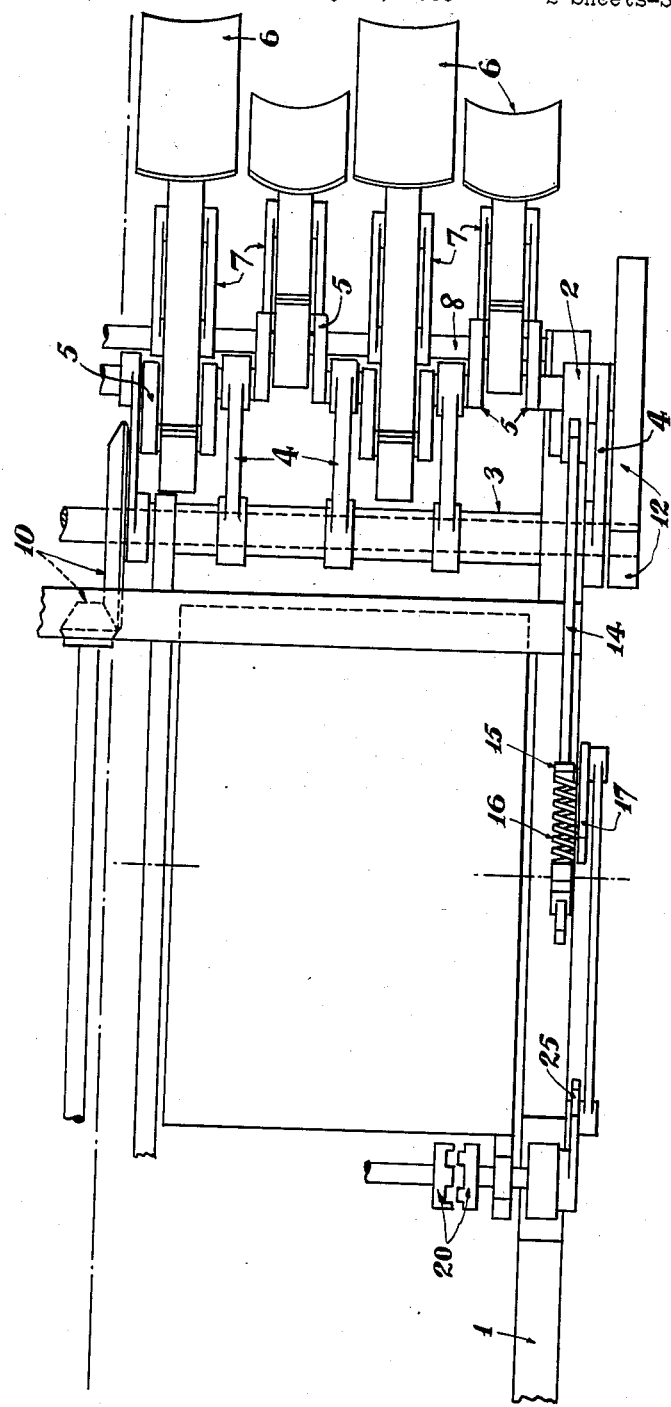

1,988,756

UNITED STATES PATENT OFFICE 1,988,756

AGRICULTURAL DIGGING MACHINE

Robert William Smith, Filey, England

Application July 17, 1933, Serial No. 680,860
In Great Britain July 14, 1932

9 Claims. (Cl. 97—36)

This invention relates to agricultural digging machines, the chief object being to provide a new or improved mechanical digger.

According to the invention, the digging machine is of the kind in which the tool or tools is or are operated by an eccentric or crank mechanism which is resiliently mounted or controlled so as to be capable of yielding when a stone or other obstruction which affords a sufficiently great resistance to digging is encountered by a tool or tools, and is characterized in that said tool or tools is or are slidably and resiliently mounted on its or their operating eccentric or crank mechanism, so that it or they can yield to a certain degree without affecting the position of the crank or eccentric.

Thus the tool, or in the case of a multi-tool machine each tool, may be adapted to slide, against the action of a spring, on a bearing block associated with the crank pin. For this purpose the arm or stock of the tool may be formed to afford a guideway for said bearing block and the spring may be carried on a guide rod between said block and an abutment on the tool arm or stock.

The resilient mounting or controlling means may comprise a spring which normally resists yielding or upward movement of the tool operating eccentric or crank mechanism if the weight of the tools and their operating eccentric or crank mechanism proves insufficient to ensure penetration of the ground to the desired depth, so that the tool or tools is or are normally kept in work. In this connection the spring may be connected to an anchoring member which is capable of being moved so as to raise the tool or tools into an inoperative position clear of the ground, said anchoring means having associated therewith mechanism whereby said anchoring means can be locked in the operative or inoperative positions as desired. The anchoring means may comprise a pivoted member adapted through an associated connecting link or rod and crank mechanism to be locked in either of two positions, whilst the movements of the tool or tools may be controlled by pivotally mounted links or radius rods, connecting it or them to the machine frame which may be adapted to be travelled over the ground as digging proceeds.

In order that the invention may be clearly understood and readily carried into effect, the same will now be more fully described with reference to and by the aid of the embodiment illustrated in the accompanying drawings; wherein:—

Figures 1 and 2 are respectively a side elevation and a half plan view of a digging machine.

Referring to the drawings, the machine comprises a wheeled frame or chassis 1 on which is mounted, in appropriate bearings 2 at the rear, a transverse shaft 3 carrying freely pivoted arms 4, the outer ends of which carry or afford bearings for a transversely disposed crank-shaft 5. The digging tools 6, which are in the form of spades, are pivotally connected one to each throw of the crank-shaft 5, and the movement of each digging tool or spade 6, imparted thereto by the rotation of the crank-shaft 5 is controlled by a radius link or rod 7 pivotally connected at one end to the tools 6 at a point a short distance above the operative portion or blade and having its other end pivotally connected to a transverse rocker shaft 8 which is carried by pivoted arms 9' depending from the frame or chassis 1. The transversely disposed shaft 3 which carries the freely pivoted bearing arms 4 for the crank-shaft 5 is hollow and constitutes a sleeve bearing for a driving shaft 9 operated through bevel gearing 10 from an engine 11 on the wheeled frame or chassis 1, and rotary motion of the crank-shaft 5 is secured from this driving shaft 9 through directly meshing spur wheels 12. The depth of digging is controlled by a wedge 13 supporting the free ends of the arms 4 carrying the crank-shaft 5, said wedge 13 being adjustable upon the frame or chassis 1 to vary the digging or working depth as desired.

In order to normally maintain the tools 6 in work and yet provide against said tools 6 being broken as a result of encountering stones or other hard objects which resist penetration of the land, lifting of the crank-shaft 5 and its associated tools 6 and carrying arms 4 about the axis of the hollow transverse shaft 3 is resisted by spring-controlled rods 14 pivotally connected to the crank-shaft carrying arms 4 and slidably mounted in blocks or guides 15 constituting anchorages for springs 16 also connected to said rods 14. Thus when the resistance to digging is not too great the tools 6 will be kept in work and will penetrate the soil, whilst if a stone or other obstruction is encountered the springs 16 will be overcome and the crank-shaft 5 and associated parts will yield or rise until the stone or obstruction has been passed, whereupon the normal working position will be automatically taken up. In this connection, the blocks or guides 15 bear against stop bolts 14' which normally take the pull of the spring 16 (see Figure 1) while the spring tension may be varied through the medium of a pin 15' and the hole connection 16'.

The blocks or guides 15 for the spring-controlled rods 14 are pivoted to sectors 17 capable of being rocked about the axis of a shaft 18 by means of a crank and connecting rod mechanism 19, the arrangement being such that when the rear dead centre position is taken up the sectors 17 are locked against displacement by the operation of the tools 6, whilst when in the forward dead centre position, as indicated in dotted lines in Figure 1, the tools are locked in a raised or inoperative position. In this latter connection, the stop bolts 14' serve as abutments for the blocks or guide 15 when pulling the sectors 17 over into the forward dead center positions so as to raise the tools and lock them in their inoperative or out-of-work positions.

Although the springs 16 assist in keeping the spades 6 down in the operative position, they offer no resistance when the spades 6 are being raised to the inoperative position by means of the crank and connecting rod mechanism 19.

The crank and connecting rod mechanism for positively raising and lowering the tools may be operated by a power-driven clutch 20, as shown, which may be normally put out and kept out of driving engagement by a spring when the crank arrives at either of the dead centres, or it may be operated by a hand lever (not shown).

In order to further ensure against undue shock and injury to the spades 6 when they encounter stones, their arms 6' are formed with guideways whereby they are adapted to slide upon bearing blocks 21 on the crank pins against the action of helical springs 22 which bear upon the undersides of said blocks 21 and the upper faces of abutments 23 afforded by the spade arms, said springs 22 being mounted upon guide rods 24 which are fixed to the bearing blocks 21 and are projected through holes in the abutments 23 when said springs 22 are compressed or overcome. In this connection, when the resistance to digging on any spade 6 is such as to overcome its associated spring 22, the spring loading afforded by the springs 16 will automatically come into action to cause the spade 6 to penetrate the soil, and should the resistance be too great for the spring loading of the rods 14, the tools and associated crank shaft 5 will be raised until the obstruction or stone has been passed, whereupon the tools will be automatically returned to the normal working position.

A spring-pressed lever 25 is adapted to engage and maintain the crank of the mechanism 19 in the rear dead centre position so as to further ensure that the sectors 17 will not be displaced by the operation of the tools when in work.

The depending pivoted arms 9' which carry the rocker shaft 8 are supported by stay bars 26 so that the position of said shaft 8 is determined, and in order to permit the angle of penetration of the spades 6 being varied said stays 26 are adjustable in length by means of turnbuckles 27.

I claim:—

1. In combination with a propelling machine of the class described, a tubular transversely disposed member, a crank shaft, means movably connecting the crank shaft to said member, a digging tool operatively connected to the crank shaft, drive means extending through the tubular member and operatively connected to the crank shaft for actuating the tool, and means operatively connected to the crank shaft for moving the tool into and out of its operative position, said last means including a plate pivoted to the machine and having a guide connected thereto, a rod slidable on said guide and connected to the crank shaft, and yieldable means confined between said rod and said guide for normally urging the tool toward its operative position.

2. In combination with a propelling machine of the class described, a tubular transversely disposed member, a crank shaft, means movably connecting the crank shaft to said member, a digging tool operatively connected to the crank shaft, drive means extending through the tubular member and operatively connected to the crank shaft for actuating the tool, means operatively connected to the crank shaft for moving the tool into and out of its operative position, said last means including a plate pivoted to the machine and having a guide connected thereto, a rod slidable on said guide and connected to the crank shaft, yieldable means confined between said rod and said guide for normally urging the tool towards its operative position, and means on said rod coacting with said guide for limiting the movement of the rod in one direction.

3. In combination with a machine of the class described, a tubular transversely disposed member, a counter-shaft having arms movably connected to said member, spaced digging tools operatively connected to the counter-shaft, drive means extending through the tubular member and operatively connected to the counter-shaft for actuating the tools, and wedge means arranged to be engaged by said arms for controlling the digging or working depth of the tools.

4. In combination with a machine of the class described, a tubular transversely disposed member, a counter-shaft having arms movably connected to said member, spaced digging tools operatively connected to the counter-shaft, drive means extending through the tubular member and operatively connected to the counter-shaft for actuating the tools, and an adjustable wedge on the machine arranged to be engaged by said arms for controlling the digging or working depth of the tools.

5. In combination with a machine of the class described, a tubular transversely disposed member, a counter-shaft having arms movably connected to said member, spaced digging tools operatively connected to the counter-shaft in advance of said tubular member, drive means extending through the tubular member and operatively connected to the counter-shaft for actuating the tools, means for controlling the digging or working depth of the tools, and movable means suspended from the machine and connected to the tool adjacent the lower end thereof for varying the angular penetration of the tool.

6. In a machine of the class described, a tubular transversely disposed member, a counter-shaft having a link connection with said member, spaced digging tools operatively connected to the counter-shaft, drive means extending through the tubular member and operatively connected to the counter-shaft for actuating the tools, means on the machine engaging said link connection for controlling the digging or working depth of the tool, a plate pivotally mounted on the machine and having a guide thereon, a rod connected to the counter-shaft and extending through said guide, yieldable means confined between said rod and said guide for normally urging the tools towards their operative positions, means for actuating said blade to move the tools into and out of their operative positions, means for maintaining the tools in either of their extreme positions, and adjustable means connected to the tools adjacent their lower ends for controlling the axial movement of the tools and for varying their angle of penetration.

7. In combination with a propelling machine of the class described, a tubular transversely disposed member, a crank shaft positioned above and offset relative to the tubular member, means movable on said tubular member and connected to said crank shaft to support the same, a digging tool operatively connected to the crank shaft and positioned in advance of said tubular member, and drive means extending through the tubular member and operatively connected to the crank shaft for actuating said tool.

8. In combination with a propelling machine of the class described, a tubular transversely disposed member, a crank shaft positioned above and offset relative to the tubular member, means movable on said tubular member and connected to said crank shaft to support the same, a digging tool operatively connected to the crank shaft and positioned in advance of said tubular member, drive means extending through the tubular member and operatively connected to the crank shaft for actuating said tool, and means suspended from the machine and pivotally connected to the tool adjacent the lower end thereof for varying the angular penetration of the tool.

9. In combination with a propelling machine of the class described, a tubular transversely disposed member, a crank shaft positioned above and offset relative to the tubular member, means movable on said tubular member and connected to said crank shaft to support the same, a digging tool having spaced arms constituting a guideway, said crank shaft having a bearing block movable in said guideway, resilient means confined between the bearing block and said tool for yieldably maintaining the tool in its operative position, and drive means extending through the tubular member and operatively connected to the crank shaft for actuating said tool.

ROBERT WILLIAM SMITH.